United States Patent
Kwun et al.

(12)

(10) Patent No.: US 8,676,205 B2
(45) Date of Patent: Mar. 18, 2014

(54) APPARATUS AND METHOD FOR CONTROLLING INTERFERENCE IN WIRELESS COMMUNICATION SYSTEM OF HIERARCHICAL CELL STRUCTURE

(75) Inventors: Jong-Hyung Kwun, Seoul (KR); Yung-Soo Kim, Seongnam-si (KR); June Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 13/151,368

(22) Filed: Jun. 2, 2011

(65) Prior Publication Data

US 2011/0300807 A1    Dec. 8, 2011

(30) Foreign Application Priority Data

Jun. 7, 2010  (KR) .................. 10-2010-0053594

(51) Int. Cl.
*H04W 36/00* (2009.01)

(52) U.S. Cl.
USPC ........ 455/436; 455/450; 455/442; 455/452.1; 370/329

(58) Field of Classification Search
USPC .......... 370/329, 331–334; 455/436, 444, 455, 455/450, 522, 442, 443, 452.1, 439
See application file for complete search history.

(56) References Cited

U.S. PATENT DOCUMENTS

| | | | |
|---|---|---|---|
| 2009/0247181 A1* | 10/2009 | Palanki et al. | 455/452.2 |
| 2010/0093358 A1 | 4/2010 | Cheong et al. | |
| 2010/0173637 A1* | 7/2010 | Damnjanovic et al. | 455/447 |
| 2011/0002307 A1* | 1/2011 | Muller et al. | 370/332 |

FOREIGN PATENT DOCUMENTS

| | | |
|---|---|---|
| JP | 2010-016420 A | 1/2010 |
| KR | 10-2010-0038558 A | 4/2010 |
| WO | 2005/048466 A2 | 5/2005 |
| WO | 2009/120934 A1 | 10/2009 |
| WO | 2010/053293 A2 | 5/2010 |

OTHER PUBLICATIONS

3GPP TS 36.331 "Evolved Universal Terrestrial Radio Access (E-UTRA) Radio Resource Control (RRC) Protocol specification" (Rel. 8, V8.9.0; published Mar. 2010), pp. 59-71.*
3GPP TS 23.009 "Technical Specification Group Core Network and Terminals; Handover procedures" (Rel. 8, V8.2.0; published Sep. 2009) pp. 26-27.*
López-Pérez et al., "Intracell Handover for Interference and Handover Mitigation in OFDMA Two-Tier Macrocell-Femtocell Networks," EURASIP Journal on Wireless Communications and Networking, vol. 2010, Article ID 142629; published Feb. 2, 2010.*

* cited by examiner

*Primary Examiner* — Minh D Dao
(74) *Attorney, Agent, or Firm* — Jefferson IP Law, LLP

(57) ABSTRACT

An apparatus and a method of a macro terminal for controlling interference in a wireless communication system of a hierarchical cell structure are provided. The method includes setting measurement reporting configuration for a blanking trigger per measurement identifier allocated by a macro base station, measuring a receive signal strength of a neighbor base station, comparing the measured receive signal strength value with a reference receive signal strength value of the measurement reporting configuration for the blanking trigger, and according to a comparison result, transmitting to the macro base station, a measurement report message comprising a measurement identifier corresponding to the measurement reporting configuration for the blanking trigger of a pico base station.

20 Claims, 15 Drawing Sheets

APPARATUS AND METHOD FOR CONTROLLING INTERFERENCE IN WIRELESS COMMUNICATION SYSTEM OF HIERARCHICAL CELL STRUCTURE

PRIORITY

This application claims the benefit under 35 U.S.C. §119(a) of a Korean patent application filed in the Korean Intellectual Property Office on Jun. 7, 2010, and assigned Serial No. 10-2010-0053594, the entire disclosure of which is hereby incorporated by reference.

BACKGROUND OF THE INVENTION

1. Field of the Invention

The present invention relates to an apparatus and a method for controlling interference between base stations in a wireless communication system of a hierarchical cell structure. More particularly, the present invention relates to an apparatus and a method for allocating a frequency band to minimize interference exerted by a picocell on a macrocell when the picocell exists in coverage of the macrocell.

2. Description of the Related Art

Recently, a picocell concept is suggested to address a propagation shadow area caused by movement of a terminal between base stations or poor channel state between the base station and the terminal and to provide a high-level data service in a cellular wireless communication system. The picocell covers a smaller area than a macrocell, and a plurality of picocells can reside in the cell coverage of one macrocell.

The macrocell and the picocell can use different frequency bands or the same frequency band. When the macrocell and the picocell use different frequency bands, interference is caused by only a signal out of band emission in each cell. Accordingly, the interference can be addressed by operating the picocell with low power. However, efficiency of the frequency band is low because an additional frequency band is needed. In contrast, when the macrocell and the picocell use the same frequency band, there is no need to use the additional frequency band but considerable interference occurs between the macrocell and the picocell.

As such, various schemes are suggested to control the interference between the cells. An example of one scheme is a Fractional Frequency Reuse (FFR) scheme. The FFR scheme maintains maximum cell efficiency and enhances the efficiency of the cell boundary. For example, as illustrated in FIG. 1, the FFR scheme divides the cell coverage to an inner region and an outer region, sets a frequency reuse factor of the inner cell region to 1, sets the frequency reuse factor of the outer cell region to 3, and thus blocks simultaneous use of the frequency band for the cell outer region. That is, the FFR scheme divides the frequency band for the cell outer region to three partial bands and allocates a user positioned in the cell outer region the partial band not overlapping with the frequency band between neighbor cells.

However, the FFR scheme is suitable for a horizontal cell layout where similar-size cells horizontally reside in succession, and it is difficult to apply the FFR scheme to a hierarchical cell structure including one or more picocells within the coverage of one macrocell.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for controlling interference between base stations in a wireless communication system of a hierarchical cell structure.

Another aspect of the present invention is to provide an apparatus and a method for allocating a frequency band to minimize interference exerted by a picocell on a macrocell in wireless communication system of a hierarchical cell structure.

Yet another aspect of the present invention is to provide an apparatus and a method for mitigating interference exerted by a picocell on an adjacent macro terminal using a partial frequency band not simultaneously used by a macrocell and a picocell, that is, using an edge-band in a wireless communication system of a hierarchical cell structure.

Still another aspect of the present invention is to provide an adaptive blanking apparatus and a method for variably determining an amount of an edge-band not allocated to a pico terminal or allocated by limiting a transmit and receive power to mitigate interference exerted by a pico base station on an adjacent macro terminal in a wireless communication system of a hierarchical cell structure.

According to an aspect of the present invention, an operating method of a macro terminal in a wireless communication system having a hierarchical cell structure is provided. The method includes setting measurement reporting configuration for a blanking trigger per measurement identifier allocated by a macro base station, measuring a receive signal strength of a neighbor base station, comparing the measured receive signal strength value with a reference receive signal strength value of the measurement reporting configuration for the blanking trigger, and according to a comparison result, transmitting to the macro base station, a measurement report message comprising a measurement identifier corresponding to the measurement reporting configuration for the blanking trigger of a pico base station.

According to another aspect of the present invention, an operating method of a macro base station in a wireless communication system having a hierarchical cell structure is provided. The method includes allocating to a macro terminal a measurement identifier with a measurement reporting configuration for a blanking trigger set, receiving a measurement report message from the macro terminal, confirming, in the received measurement report message, the measurement identifier corresponding to the measurement reporting configuration for the blanking trigger of a pico base station, and, based on the confirmed measurement identifier, transmitting a handover required message comprising a cause value for the blanking to a Mobility Management Entity (MME).

According to yet another aspect of the present invention, an operating method of a pico base station in a wireless communication system having a hierarchical cell structure is provided. The method includes receiving a handover required message from an MME, confirming a cause value for blanking in the received handover required message, and, based on the confirmed cause value, starting or stopping a blanking operation for a corresponding macro terminal.

According to still another aspect of the present invention, an apparatus of a macro terminal in a wireless communication system having a hierarchical cell structure is provided. The apparatus includes a report information measurer for setting measurement reporting configuration for blanking trigger per measurement identifier allocated by a macro base station, for measuring a receive signal strength of a neighbor base station, for comparing the measured receive signal strength value with a reference receive signal strength value of the measurement reporting configuration for the blanking trigger, and, according to a comparison result, for generating a measurement report message comprising a measurement identifier corresponding to the measurement reporting configuration for the blanking trigger of a pico base station, and a transmitter for transmitting the generated measurement report message to the macro base station.

According to a further aspect of the present invention, an apparatus of a macro base station in a wireless communication system having a hierarchical cell structure is provided. The apparatus includes a receiver for receiving a measurement report message from a macro terminal, a report information manager for allocating to the macro terminal a measurement identifier with a measurement reporting configuration for a blanking trigger set, for confirming, in the received measurement report message, the measurement identifier corresponding to the measurement reporting configuration for the blanking trigger of a pico base station, and, based on the confirmed measurement identifier, for generating a handover required message comprising a cause value for the blanking, and a handover related message transceiver for transmitting the generated handover required message to an MME.

According to a further aspect of the present invention, an apparatus of a pico base station in a wireless communication system having a hierarchical cell structure is provided. The apparatus includes a handover related message transceiver for receiving a handover required message from an MME, and a blanking controller for confirming a cause value for blanking in the received handover required message, and for starting or stopping a blanking operation for a corresponding macro terminal based on the confirmed cause value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a frequency band allocation technique for minimizing interference exerted by a picocell on a macrocell in a wireless communication system of a hierarchical cell structure.

Herein, the wireless communication system of the hierarchical cell structure indicates a wireless communication system including cells of different sizes. While a wireless communication system including a macrocell and a picocell is exemplified here, it is noted that the present invention is applicable to every wireless communication system including cells of different sizes.

Hereinafter, it is assumed that the picocell lies in coverage of the macrocell and the macrocell and the picocell use the same frequency band. A User Equipment (UE) serviced by a macro base station is referred to as a macro terminal, and a UE serviced by a pico base station is referred to as a pico terminal.

Figure 1:
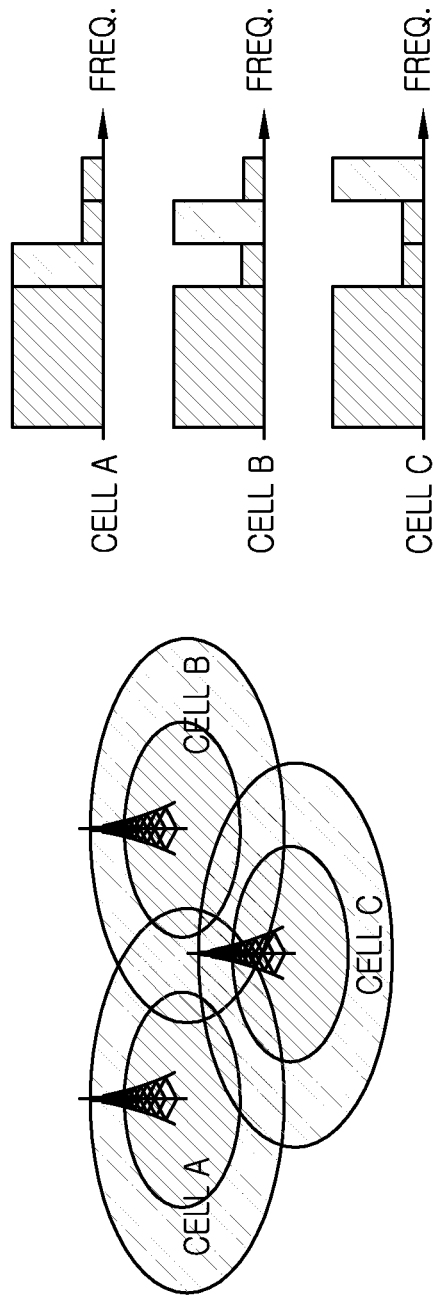
FIG. 1 illustrates a Fractional Frequency Reuse (FFR) scheme in a wireless communication system according to the related art.
Figure 2:
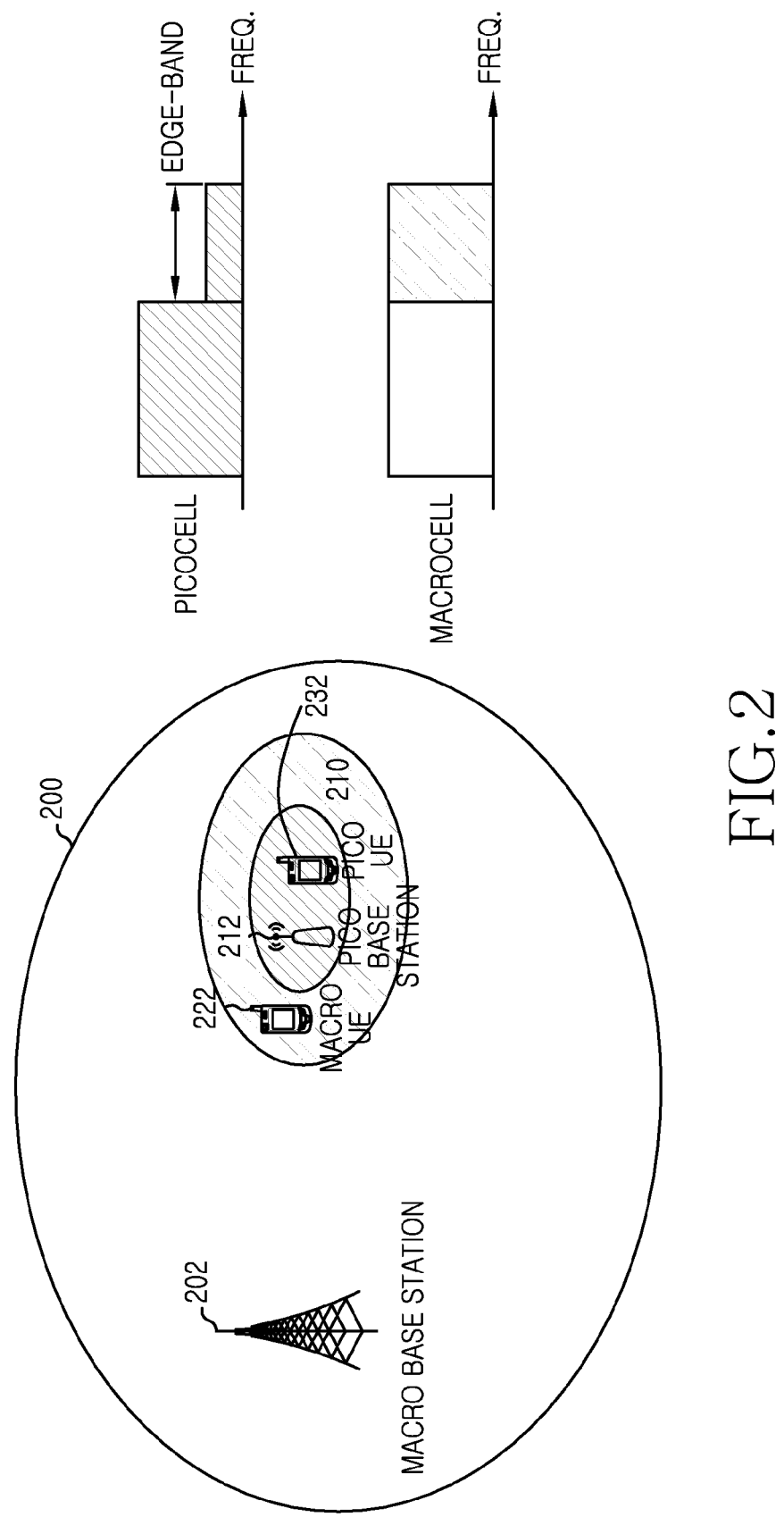
FIG. 2 illustrates a frequency band allocation method in a wireless communication system of a hierarchical cell structure according to an exemplary embodiment of the present invention.

FIG. 2 illustrates a frequency band allocation method in a wireless communication system of a hierarchical cell structure according to an exemplary embodiment of the present invention.

Referring to FIG. 2, a picocell 210 managed by a pico base station 212 hierarchically lies in a macrocell 200 managed by a macro base station 202. It is assumed that a macro UE 222 is close to the picocell 210 and greatly interfered by the picocell 210.

A partial frequency band not used by the macrocell 200 and the picocell 210 at the same time is obtained from an entire frequency band used by the macrocell 200 and the picocell 210, and the macro base station 202 allocates the partial frequency band not used by the picocell 210 to the macro UE 222 which is close to the picocell 210 and considerably interfered by the picocell 210. Thus, the interference exerted by the picocell 210 on the adjacent macro UE 222 can be reduced. The pico base station 212 does not allocate to a pico UE 232 the partial frequency band or can allocate the partial frequency band to the macro UE 222 with low transmit and receive power which does not exert the interference.

The partial frequency band is referred to as an edge-band. Herein, the edge-band, which is physical radio resources used to transmit and receive data and control information in the hierarchical cell structure, can include one or more subbands or one or more Physical Resource Blocks (PRBs). In a multi-carrier system, the edge-band can include one or more Component Carriers (CCs).

The operation of the pico base station 212 for not allocating the edge-band to the pico UE 232 or allocating the edge-band by limiting the transmit and receive power to reduce the interference on the adjacent macro UE 222 is referred to as a blanking operation.

When there is no macro UE 222 greatly interfered by the pico base station 212, that is, when there is no macro UE 222 requiring the blanking operation, the pico base station 212 stops the blanking operation and increases a cell capacity of the pico base station 212 by allocating the edge-band used in the blanking operation to the pico UE 232. When the macro UE 222 greatly interfered by the pico base station 212 arises or increases, that is, when the macro UE 222 requiring the blanking operation arises or increases, the pico base station 212 recognizes the occurrence or the increase and mitigates the interference on every macro UE 222 greatly interfered by the pico base station 212 by increasing the amount of the edge-band used in the blanking operation. Herein, the pico base station 212 variably determines the amount of the edge-band by considering one or more of the number of the macro terminals 222 requiring the blanking operation, a data transfer quantity of the macro UE 222, and a radio channel environment between the macro UE 222 and the macro base station 202.

Hereinafter, an adaptive blanking method of the pico base station for variably determining an amount of the necessary edge-band for the blanking operation in the wireless communication system of the hierarchical cell structure is described. More particularly, a method for variably determining a blanking start point, a blanking stop point, and the quantity of the radio resource used for the blanking will be described below.

The adaptive blanking operation of the present invention includes a blanking triggering step of the macro UE for recognizing the interference from the pico base station, a blanking request step of the macro base station for requesting the blanking to the pico base station, a blanking start step of the pico base station for variably determining the amount of the edge-band required for the blanking operation and not allocating the pico UE the edge band variably determined, and a blanking stop step of the pico base station for releasing the setting of the edge-band for the blanking operation.

The steps are performed per macro terminal. More specifically, the macro base station recognizes the macro terminals requiring the blanking operation, and requests the blanking to the pico base station per macro terminal. The pico base station determines the quantity of the radio resource required for the blanking operation, for example, the number of the subbands (hereinafter, referred to as the number of the blanking subbands) with respect to the macro terminals requested by the macro base station for the blanking operation, and determines the total number of the blanking subbands of the pico base station at the corresponding point by combining the determined numbers.

Herein, a maximum number of the blanking subbands which can be set by the pico base station is preset, and the subbands as many as the smaller value of the total number of the blanking subbands combined and determined and the settable maximum value is used in the actual blanking. The settable maximum value is a variable defined as an adequate value by taking into account speech quality significance of the macro terminal. When a provider sets a higher speed quality significance of the macro UE than the system capacity of the pico base station, the maximum value can be defined as the maximum quantity of the radio resource allocable by the pico base station.

Hereinafter, the adaptive blanking is explained based on, but not limited to, a Long Term Evolution (LTE) standard according to two exemplary embodiments of the present invention.

According to an exemplary embodiment of the present invention, the adaptive blanking operation is fulfilled by converting and reusing a cause value of messages between the base stations used in a handover procedure between the base stations.

According to an alternative exemplary embodiment of the present invention, the adaptive blanking operation is fulfilled by adding UE measurement related information, as a new Information Element (IE), to the messages between the base stations used in the handover procedure between the base stations.

Figure 3:
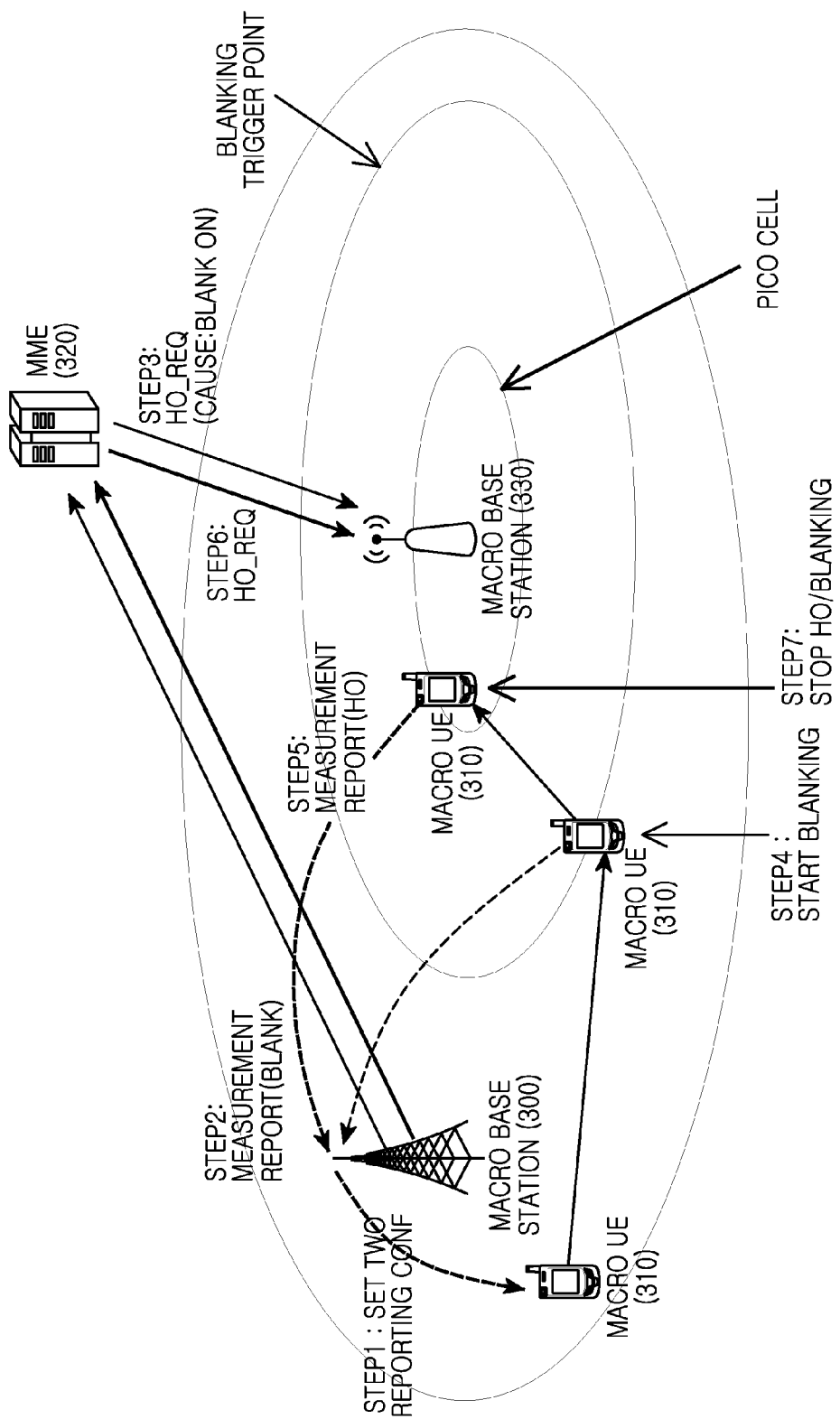
FIG. 3 illustrates an adaptive blanking method by converting and reusing a cause value of messages between base stations used in a handover procedure between the base stations in a wireless communication system of a hierarchical cell structure according to an exemplary embodiment of the present invention.

FIG. 3 illustrates an adaptive blanking method by converting and reusing a cause value of messages between base stations used in a handover procedure between the base stations in a wireless communication system of a hierarchical cell structure according to an exemplary embodiment of the present invention. Handover preparation procedure related messages on an S1 interface defined for the handover between the base stations in a $3^{rd}$ Generation Partnership Project (3GPP) standard are exemplified to facilitate the understanding in FIG. 3, whereas handover preparation procedure related messages on an X2 interface can be equally applied.

This exemplary embodiment of the present invention is equally applied to a case where another Mobility Management Entity (MME) or a separate pico gateway is defined as a network entity.

Referring to FIG. 3, in step 1, the macro base station 300 sets two or more measurement reporting configurations with respect to one measurement object identifier corresponding to the frequency used by the pico base station 330 by transmitting a Radio Resource Control (RRC) connection reconfiguration message to the macro UE 310 within the cell. That is, the macro base station 300 distinguishes and defines a measurement reporting configuration for a blanking trigger to recognize that a macro UE 310 requires the blanking operation, and measurement reporting configuration for handover trigger to recognize that the macro UE 310 needs to hand over, using a separate Measurement IDentification (MeasID). Herein, step 1 shall be elucidated by referring to FIG. 4.

In step 2, when the macro UE 310 approaches the pico base station 330 and satisfies a reporting criteria of the measurement reporting configuration for the blanking trigger, that is, when the macro UE 310 enters a blanking region, the macro UE 310 reports corresponding information by transmitting a measurement report message including the blanking trigger MeasID to the macro base station 300 which is a serving base station.

In step 3, the macro base station 300 can recognize, based on the MeasID of the measurement report message received from the macro UE 310, whether the blanking operation of the pico base station 330 is required for the corresponding macro UE 310. Upon recognizing that the blanking operation of the pico base station 330 is required for the corresponding macro UE 310, the macro base station 300 requests the blanking operation to the pico base station 330 having a base station ID contained in the measurement report message. For instance, the macro base station 300 transmits to an MME 320 a HandOver (HO) required message including a cause value 'Blank ON' to request the blanking operation. The MME 320 receiving the message transmits to the pico base station 330 a HO request message including the cause value 'Blank ON'. Herein, the step 3 shall be described in more detail below by referring to FIG. 5.

In step 4, the pico base station 330 receiving the HO request message including the cause value 'Blank ON' starts the blanking operation, instead of the handover preparation procedure, for the corresponding macro UE 310. In so doing, the pico base station 330 determines the amount of the radio resource required for the blanking operation for the corresponding macro UE 310. For example, the pico base station 330 can determine the amount of the necessary radio resource using user information (e.g., a service type of the corresponding user, and a data transfer rate) of the macro UE 310 contained in the HO request message. When receiving measurement report information (e.g., a link quality of the physical channel) of the terminal, the pico base station 330 can more accurately determine the amount of the necessary radio resource also using the measurement report information.

In step 5, when the macro UE 310 entering the blanking region further approaches the cell coverage of the pico base station 330 and satisfies the reporting criteria of the measurement reporting configuration for the handover trigger, the macro UE 310 reports corresponding information by transmitting a measurement report message including the MeasID for the handover trigger to the macro base station 300 which is its serving base station.

In step 6, the macro base station 300 can recognize, based on the MeasID of the measurement report message received from the macro UE 310, whether the handover operation to the pico base station 330 is required for the corresponding macro UE 310. When recognizing that the handover operation of the pico base station 330 is necessary for the corresponding macro UE 310, the macro base station 300 requests the handover preparation procedure to the pico base station 330 having the base station ID contained in the measurement report message. For example, the macro base station 300 transmits to the MME 320 a HO required message including the cause value for the handover, rather than the cause value defined to request the blanking. The MME 320, receiving the message, transmits a HO request message including the cause value for the handover to the pico base station 330. Herein, the step 6 shall be elucidated by referring to FIG. 6.

In step 7, the pico base station 330, receiving the HO request message including the cause value for the handover, normally conducts the handover preparation procedure for the corresponding macro UE 310. After normally completing the handover procedure for the corresponding macro UE 310, the pico base station 330 stops the blanking operation for the macro UE 310.

Figure 4:
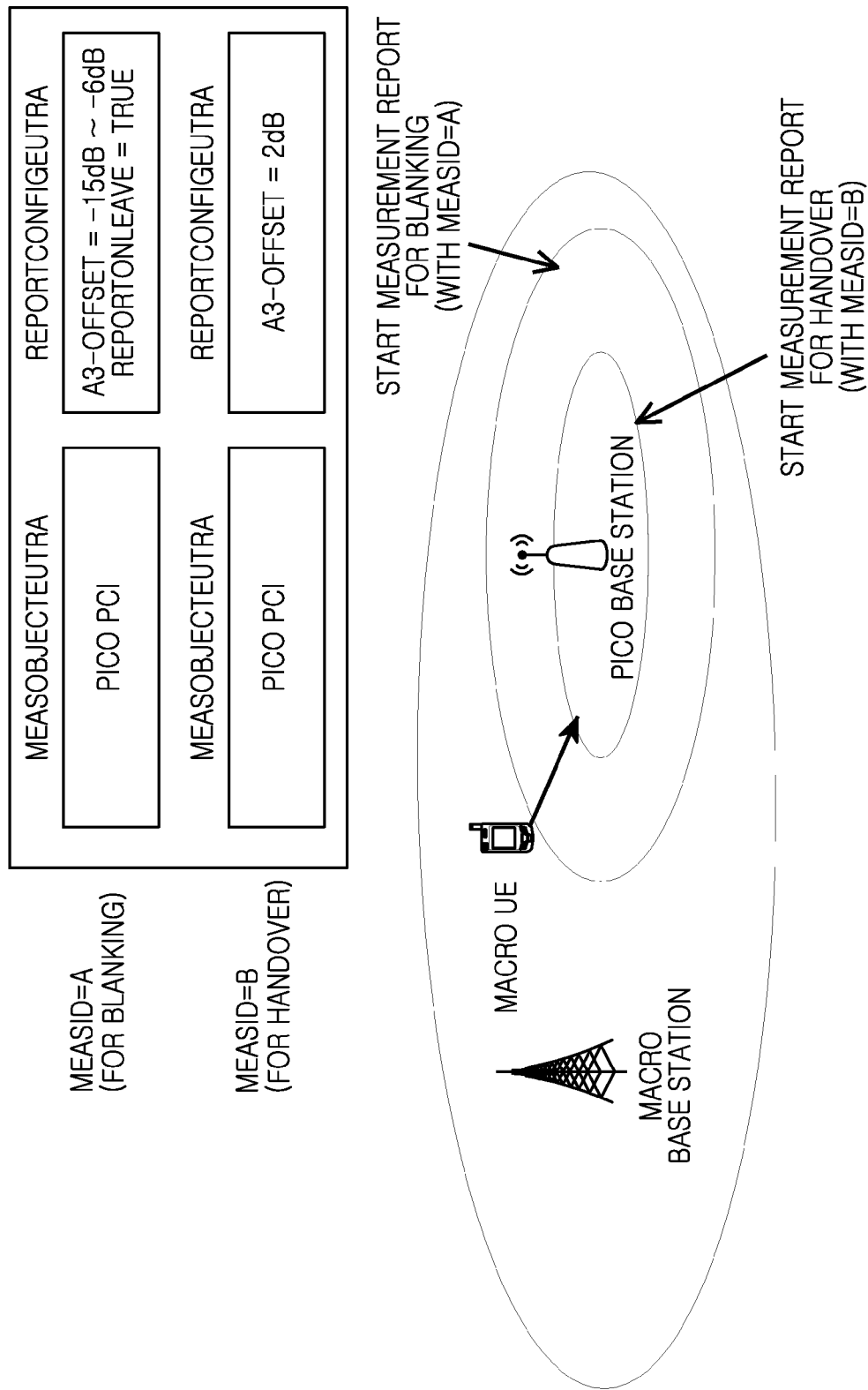
FIG. 4 illustrates a measurement reporting configuration setting method in a wireless communication system of a hierarchical cell structure according to an exemplary embodiment of the present invention.

FIG. 4 illustrates a measurement reporting configuration setting method in a wireless communication system of a hierarchical cell structure according to an exemplary embodiment of the present invention.

By transmitting an RRC connection reconfiguration message to a macro UE in the cell, the macro base station sets two or more measurement reporting configurations for one measurement object identifier corresponding to the frequency used by the pico base station 330. In more detail, the macro base station distinguishes and defines the measurement reporting configuration for the blanking trigger to recognize that the macro UE requires the blanking operation, and the measurement reporting configuration for the handover trigger to recognize that the macro UE needs the handover operation using a separate MeasID. In FIG. 4, the macro base station sets two ReportConfigEUTRA IEs having different MeasIDs, as an example of the measurement reporting configuration An A3-offset value in the ReportConfigEUTRA IE for the blanking, which is a value indicating a range of a reference receive signal strength (e.g., Signal to Noise Ratio (SNR), Signal to Interference-plus-Noise Ratio (SINR), Carrier to Interference-plus-Noise Ratio (CINR), and Carrier to Noise Ratio (CNR)) for controlling the adaptive blanking operation, is set according to a start point of the blanking operation, that is, according to a blanking trigger point for the macro terminal. For example, when the A3-offset value is set to a low value such as −15 dB, the macro UE under the reducing interference from the pico base station through the blanking operation increases but the system capacity of the pico base station can be decreased because the pico base station cannot allocate to the pico UE the large amount of radio resources. When the ReportConfigEUTRA IE for the blanking uses an A3 event as the reporting criteria, ReportOnLeave is set to TRUE so that the macro terminal, when leaving the blanking region, reports its leaving to the macro base station. When other events (except for the A3) not setting the ReportOnLeave are used, the macro UE periodically reports the measurement result value and thus the macro base station recognizes the leaving of the blanking region of the macro terminal. An A3-offset value in the ReportConfigEUTRA IE for the handover is a value indicating the reference receive signal strength (e.g., SNR, SINR, CINR, and CNR) for controlling the handover.

Figure 5:
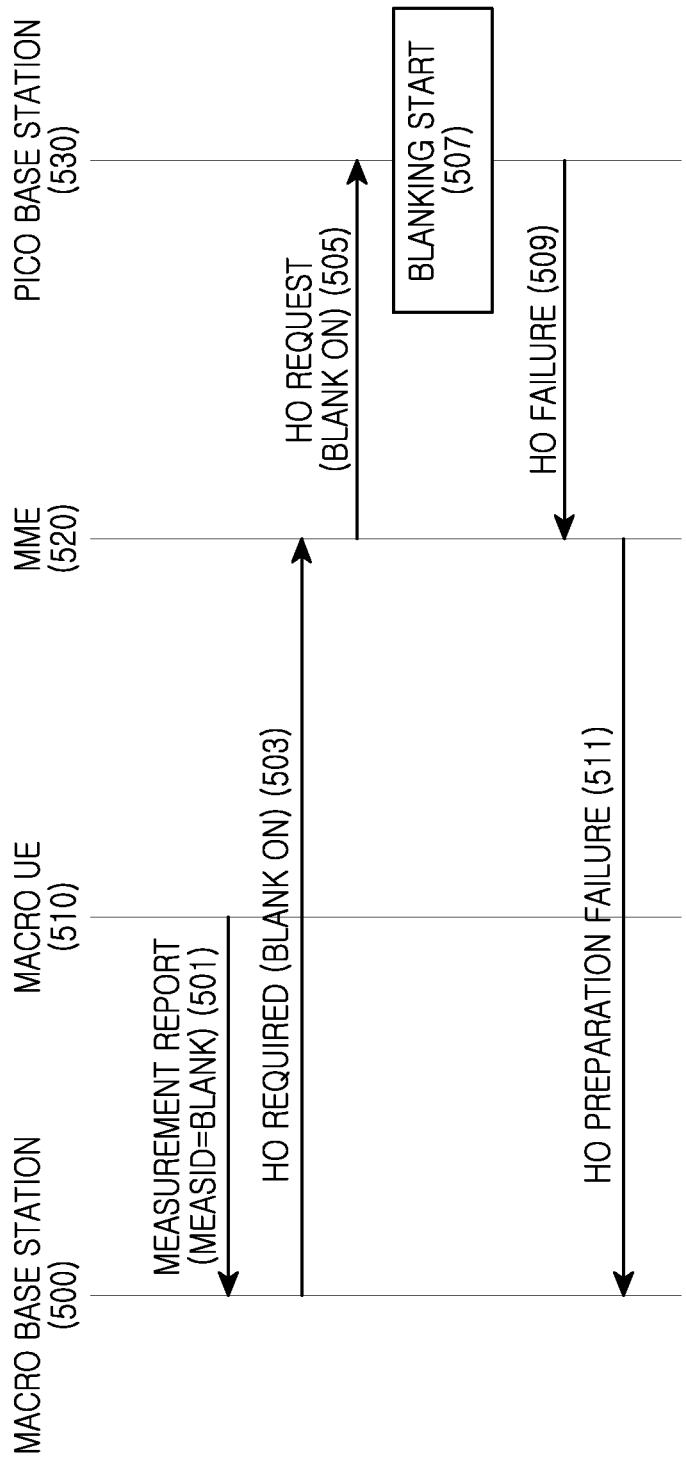
FIG. 5 illustrates an adaptive blanking start process in a wireless communication system of a hierarchical cell structure according to an exemplary embodiment of the present invention.

FIG. 5 illustrates an adaptive blanking start process in a wireless communication system of a hierarchical cell structure according to an exemplary embodiment of the present invention.

A macro base station 500 receives a measurement report message from a macro UE 510 in step 501, and recognizes whether a blanking operation of a pico base station 530 is required for the corresponding macro UE 510 which enters the blanking region, based on an MeasID, a base station ID, and a measurement result value of a received measurement report message. For example, the macro base station 500 determines that the blanking operation is necessary only when the MeasID is an ID for a blanking trigger, the base station ID is the pico base station, and the measurement result value corresponds to an entering condition of the measurement reporting configuration for the blanking trigger. When the MeasID and the measurement result value meet the criteria but the corresponding base station ID is the macro base station, the macro base station 500 determines that the blanking operation of the pico base station is unnecessary. When recognizing that the blanking operation of the pico base station 530 is required for the corresponding macro UE 510, the macro base station 500 can request the blanking operation to the pico base station 530 having the base station ID of the measurement report message.

To reuse the handover procedure related message as the message for requesting the blanking operation, the macro base station 500 and the pico base station 530 define a new cause value 'Blank ON'. The 'Blank ON' can be additionally defined in a standard and added according to internal definitions between the macro base station 500 and the pico base station 530. Also, an unused value of standard cause values defined in the existing standard can be substituted by the 'Blank On' and then used.

Hence, to request the blanking operation to the pico base station 530 having the base station ID contained in the measurement report message, the macro base station 500 transmits to an MME 520 a HO required message including the cause value 'Blank ON' in step 503. The MME 520 receiving the message transmits the HO request message including the cause value 'Blank ON' to the pico base station 530 in step 505.

The pico base station 530 starts the blanking operation with respect to the macro UE 510 requested by the macro base station 500 for the blanking operation in step 507, and transmits a HO failure message to the MME 520 in step 509. The MME 520 receiving the HO failure message stops the blanking operation request procedure by transmitting a HO preparation failure message to the macro base station 500 in step 511. Herein, upon receiving the HO preparation failure message after the HO required message including the cause value 'Blank ON' is transmitted, the macro base station 500 can confirm that the blanking operation is successfully requested. At this time, the cause value of the HO failure message and the HO preparation failure message can be selectively set to 'Blank ON' to prevent error in handover failure probability statistical gathering of the macro base station 500.

Figure 6:
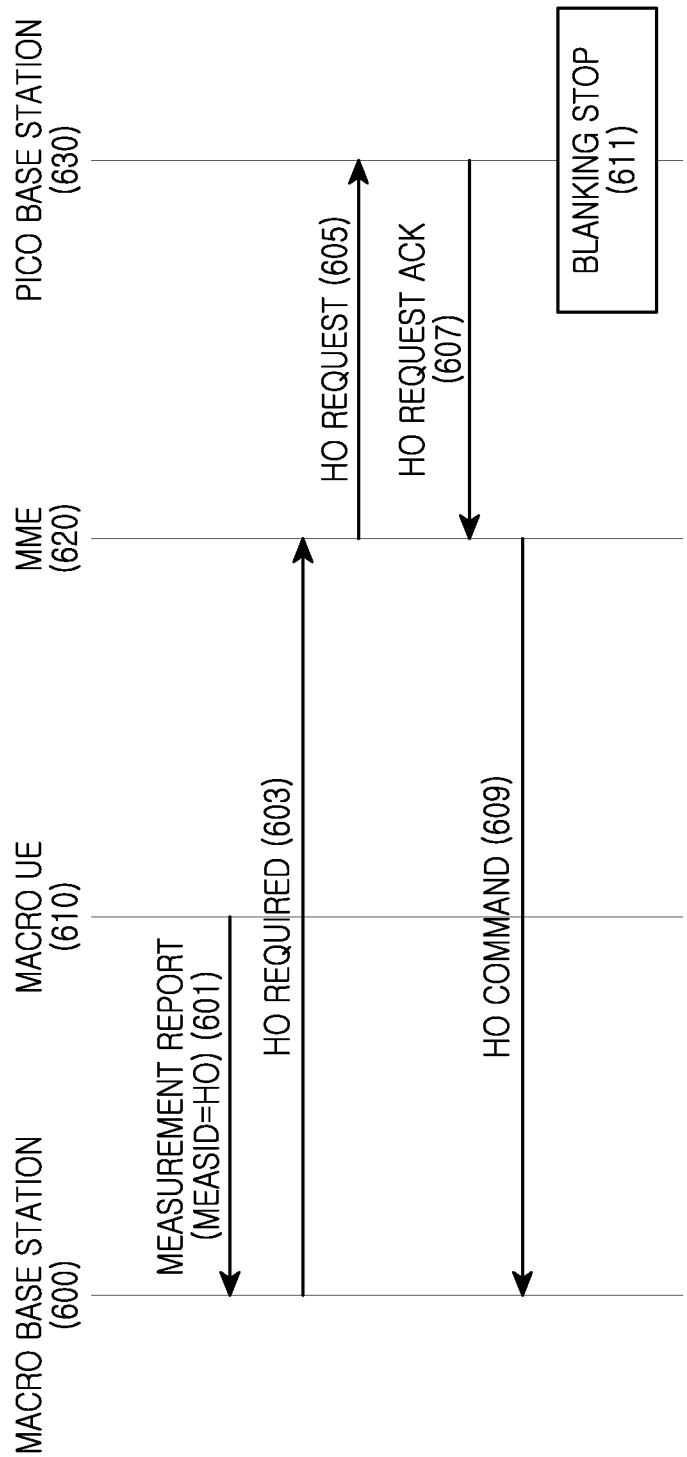
FIG. 6 illustrates an adaptive blanking release process according to handover in a wireless communication system of a hierarchical cell structure according to an exemplary embodiment of the present invention.

FIG. 6 illustrates an adaptive blanking release process according to a handover in a wireless communication system of a hierarchical cell structure according to an exemplary embodiment of the present invention.

The macro base station 600 receives a measurement report message from a macro UE 610 in step 601, and recognizes whether a handover operation to a pico base station 630 is required for a corresponding macro UE 610, based on an MeasID of a received measurement report message. For example, the macro base station 600 determines that a handover operation is necessary when the MeasID is not an ID for a blanking trigger. When recognizing that the handover operation of the pico base station 630 is required for the corresponding macro UE 610, the macro base station 600 can request a handover preparation procedure to the pico base station 630 having the base station ID of the measurement report message.

Hence, the macro base station 600 transmits to an MME 620 a HO required message including a cause value defined for the handover, rather than the cause value defined to request a blanking operation, in step 603. The MME 620 receiving the message transmits a HO request message including the cause value defined for the handover, to the pico base station 630 in step 605.

The pico base station 630, receiving the HO request message including the cause value defined for the handover, normally conducts the handover preparation procedure for the corresponding macro UE 610. That is, when the pico base station 630 receiving the HO request message permits the handover, it transmits a handover request ACKnowledgement (ACK) message to the MME 620 in step 607. The MME 620 receiving the ACK transmits a HO command message to the macro base station 600 in step 609. As such, after normally completing the handover procedure for the corresponding macro UE 610, the pico base station 630 stops the blanking operation for the macro UE 610 in step 611.

Figure 7:
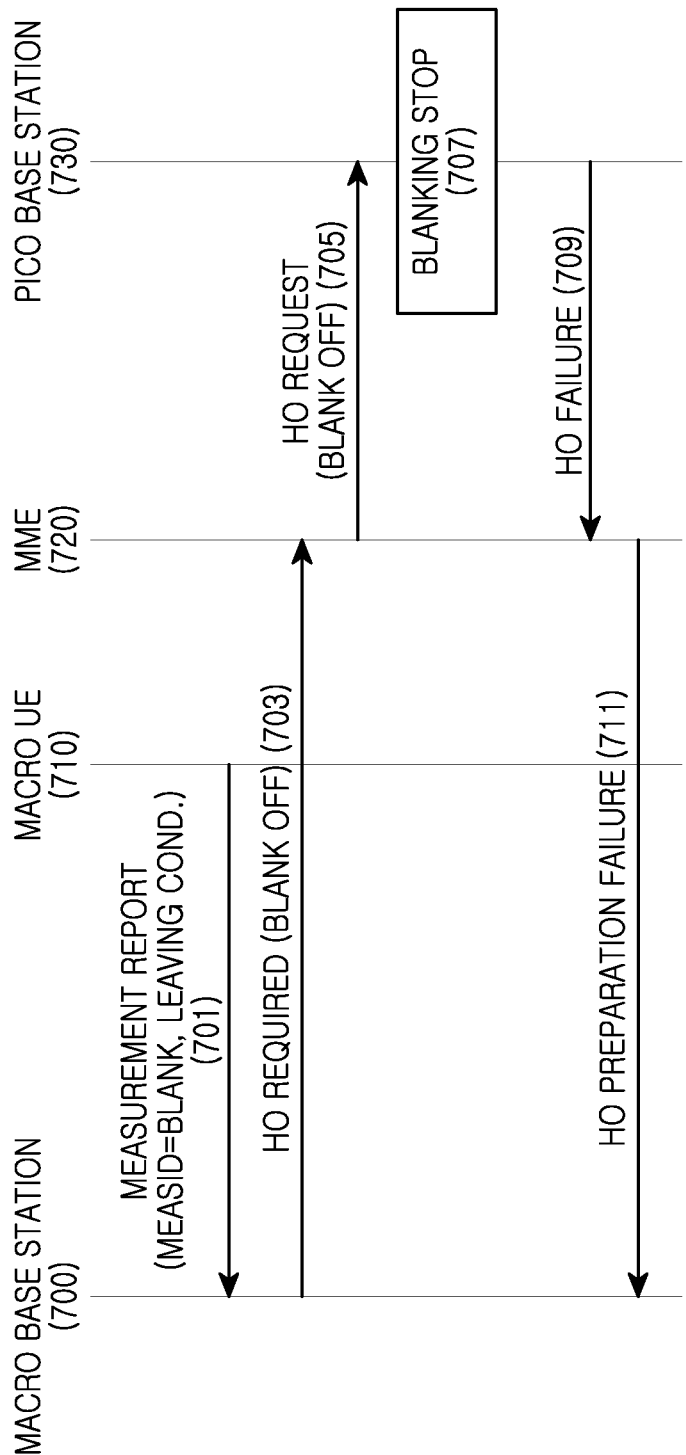
FIG. 7 illustrates an adaptive blanking release process according to a blanking region egression in a wireless communication system of a hierarchical cell structure according to an exemplary embodiment of the present invention.

FIG. 7 illustrates an adaptive blanking release process according to a blanking region egression in a wireless communication system of a hierarchical cell structure according to an exemplary embodiment of the present invention.

The macro base station 700 receives a measurement report message from a macro UE 710 in step 701, and recognizes whether the corresponding macro UE 710 leaves a blanking region and whether the blanking operation needs to stop, based on an MeasID, a base station ID, and a measurement result value of a received measurement report message. For example, the macro base station 700 determines that it is necessary to stop the blanking operation only when the MeasID is an ID for a blanking trigger, the base station ID is the pico base station, and the measurement result value corresponds to a leaving condition of a measurement reporting configuration for the blanking trigger. When the MeasID and the measurement result value meet the criteria but the corresponding base station ID is the macro base station, the macro base station 700 determines that it is not necessary to stop the blanking operation of the pico base station. When recognizing that the corresponding macro UE 710 leaves the blanking region and the blanking operation needs to stop, the macro base station 700 can request the pico base station 730 having the base station ID of the measurement report message, to release the blanking operation.

To reuse the handover procedure related message as the message for releasing the blanking operation, the macro base station 700 and the pico base station 730 define a new cause value 'Blank OFF'. The 'Blank OFF' can be additionally defined in the standard, and added according to internal definitions between the macro base station 700 and the pico base station 730. Also, an unused value of the standard cause values defined in an existing standard can be substituted by 'Blank OFF' and then used.

Hence, the macro base station 700 transmits to the MME 720 the HO required message including the cause value 'Blank OFF' requesting to release the blanking operation to the pico base station 730 having the base station ID contained in the measurement report message in step 703. The MME 720 receiving the message transmits the HO request message including the cause value 'Blank OFF' to the pico base station 730 in step 705.

The pico base station 730 stops the blanking operation with respect to the macro UE 710 requested by the macro base station 700 for the blanking operation release in step 707, and transmits a HO failure message to the MME 720 in step 709.

The MME 720 receiving the HO failure message stops the blanking operation release procedure by transmitting the HO preparation failure message to the macro base station 700 in step 711. At this time, selectively, the cause value of the HO failure message and the HO preparation failure message can be set to 'Blank OFF' to prevent error in the handover failure probability statistical gathering of the macro base station 700.

According to an alternative exemplary embodiment of the present invention, the macro base station requests the blanking operation to the pico base station by transmitting the handover related message similar to the handover related message according to an exemplary embodiment of the present invention. A difference in the handover related message according to an exemplary embodiment of the present invention is that UE measurement related information is added to the existing handover related message transmitted so that the pico base station receiving the handover related message can distinguish the handover related message for the handover request or the handover related message for the blanking request. In other words, the HO required message and the HO request message, which are the handover related messages, include RRC container information of the corresponding terminal. A UE measurement related information field is added into an RRC container IE.

The pico base station receives the HO request message and determines whether to perform the blanking operation or the handover operation using the UE measurement related information of the RRC container IE of the HO request message. Herein, the UE measurement related information includes a final measurement result value or the MeasID of the macro UE requested to transmit the HO required message.

Herein, when the MeasID, as the UE measurement related information, is added to the existing handover related message transmitted, the pico base station can distinguish whether the MeasID is allocated for the handover trigger or the blanking trigger using the measurement reporting configuration IE (the measurement reporting configuration IE set to the macro terminal) of the HO request message.

Herein, when the measurement result value, as the UE measurement related information, is added to the existing handover related message transmitted, the pico base station can compare the measurement result value with an entering condition and a leaving condition of the measurement reporting configuration using the measurement reporting configuration IE of the HO request message, and distinguish whether it is allocated for the handover trigger or the blanking trigger and whether it requests to start or release the blanking operation.

Figure 8A:
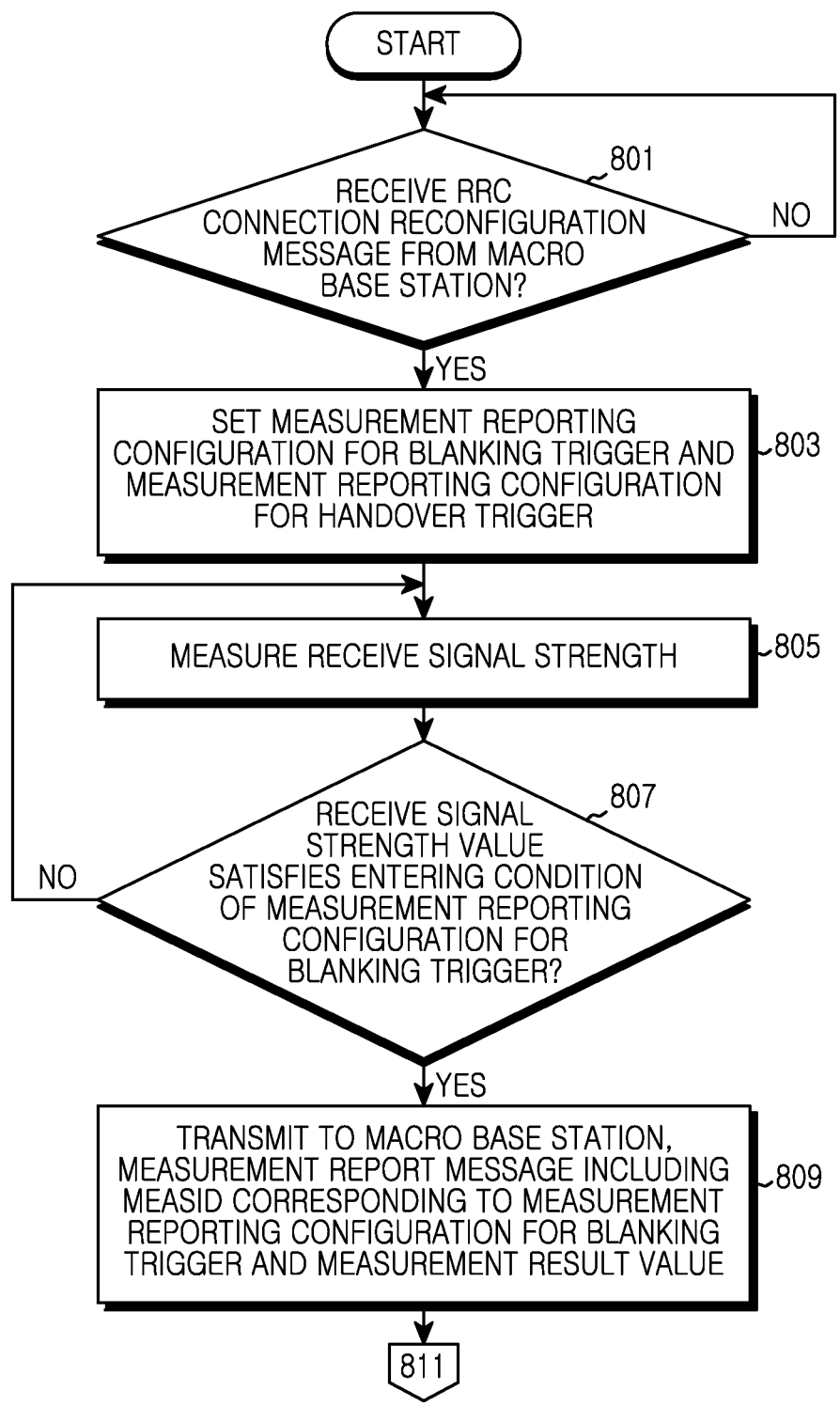
FIGS. 8A and 8B illustrate operations of a macro User Equipment (UE) in a wireless communication system of a hierarchical cell structure according to an exemplary embodiment of the present invention.
Figure 8B:
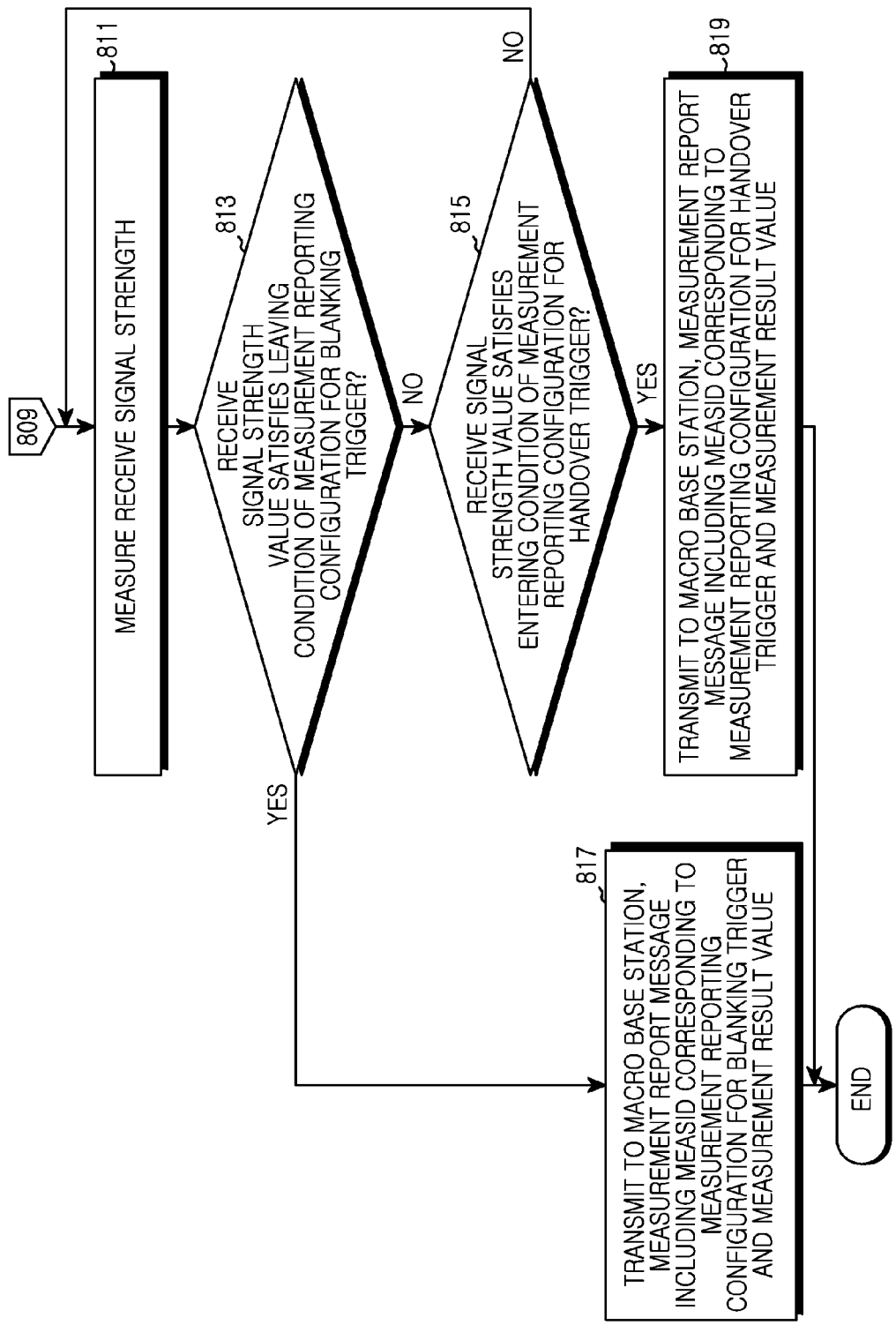

FIGS. 8A and 8B illustrate operations of a macro UE in a wireless communication system of a hierarchical cell structure according to an exemplary embodiment of the present invention.

In step 801, the macro UE determines whether an RRC connection reconfiguration message is received from a macro base station. Herein, the RRC connection reconfiguration message is transmitted from a macro base station to a macro UE on a periodic basis or according to an event.

Upon receiving the RRC connection reconfiguration message in step 801, the macro UE sets a measurement reporting configuration for a blanking trigger and a measurement reporting configuration for a handover trigger using the received RRC connection reconfiguration message in step 803.

Next, the macro UE measures a receive signal strength of a neighbor base station in step 805, and examines whether the measured receive signal strength value satisfies an entering condition of the measurement reporting configuration for the blanking trigger of a corresponding pico base station per pico base station in step 807.

When the measured receive signal strength value does not satisfy the entering condition of the measurement reporting configuration for the blanking trigger of the adjacent pico base station in step 807, the macro UE returns to step 805.

In contrast, when the measured receive signal strength value satisfies the entering condition of the measurement reporting configuration for the blanking trigger of the adjacent pico base station in step 807, the macro UE transmits to the macro base station the measurement report message including the MeasID corresponding to the measurement reporting configuration for the blanking trigger of the corresponding pico base station and the measurement result value indicating the entry to the blanking region to perform the blanking operation of the corresponding pico base station in step 809.

The macro UE measures the receive signal strength of the neighbor base station in step 811, and examines whether the measured receive signal strength value satisfies a leaving condition of the measurement reporting configuration for the blanking trigger of the pico base station which previously performs the blanking operation for the macro UE in step 813.

When the measured receive signal strength value satisfies the leaving condition of the measurement reporting configuration for the blanking trigger of the pico base station which previously performs the blanking operation for the macro UE in step 813, the macro UE transmits to the macro base station the measurement report message including the MeasID corresponding to the measurement reporting configuration for the blanking trigger of the corresponding pico base station and the measurement result value indicating the leaving from the blanking region in step 817, and then ends the process.

When the measured receive signal strength value does not satisfy the leaving condition of the measurement reporting configuration for the blanking trigger of the pico base station which previously performs the blanking operation for the macro UE in step 813, the macro UE examines whether the measured receive signal strength value satisfies the entering condition of the measurement reporting configuration for the handover trigger of the adjacent pico base station in step 815.

When the measured receive signal strength value satisfies the entering condition of the measurement reporting configuration for the handover trigger of the adjacent pico base station in step 815, the macro UE transmits to the macro base station the measurement report message including the MeasID corresponding to the measurement reporting configuration for the handover trigger of the corresponding pico base station and the measurement result value to perform the handover preparation procedure of the corresponding pico base station in step 819, and then ends the process.

In contrast, when the measured receive signal strength value does not satisfy the entering condition of the measurement reporting configuration for the handover trigger of the adjacent pico base station in step 815, the macro UE returns to step 811.

Figure 9A:
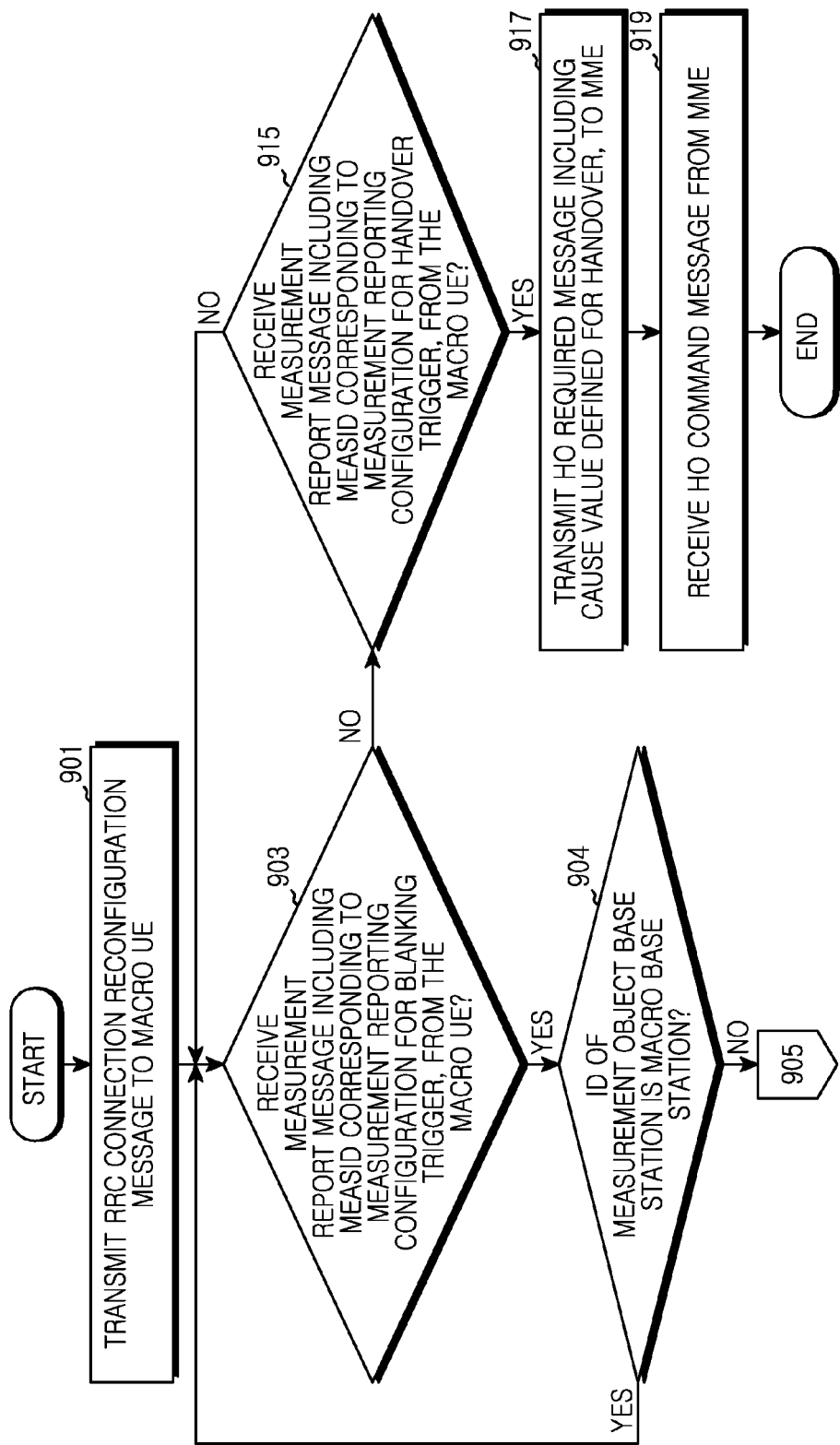
FIGS. 9A and 9B illustrate operations of a macro base station in a wireless communication system of a hierarchical cell structure according to an exemplary embodiment of the present invention.
Figure 9B:
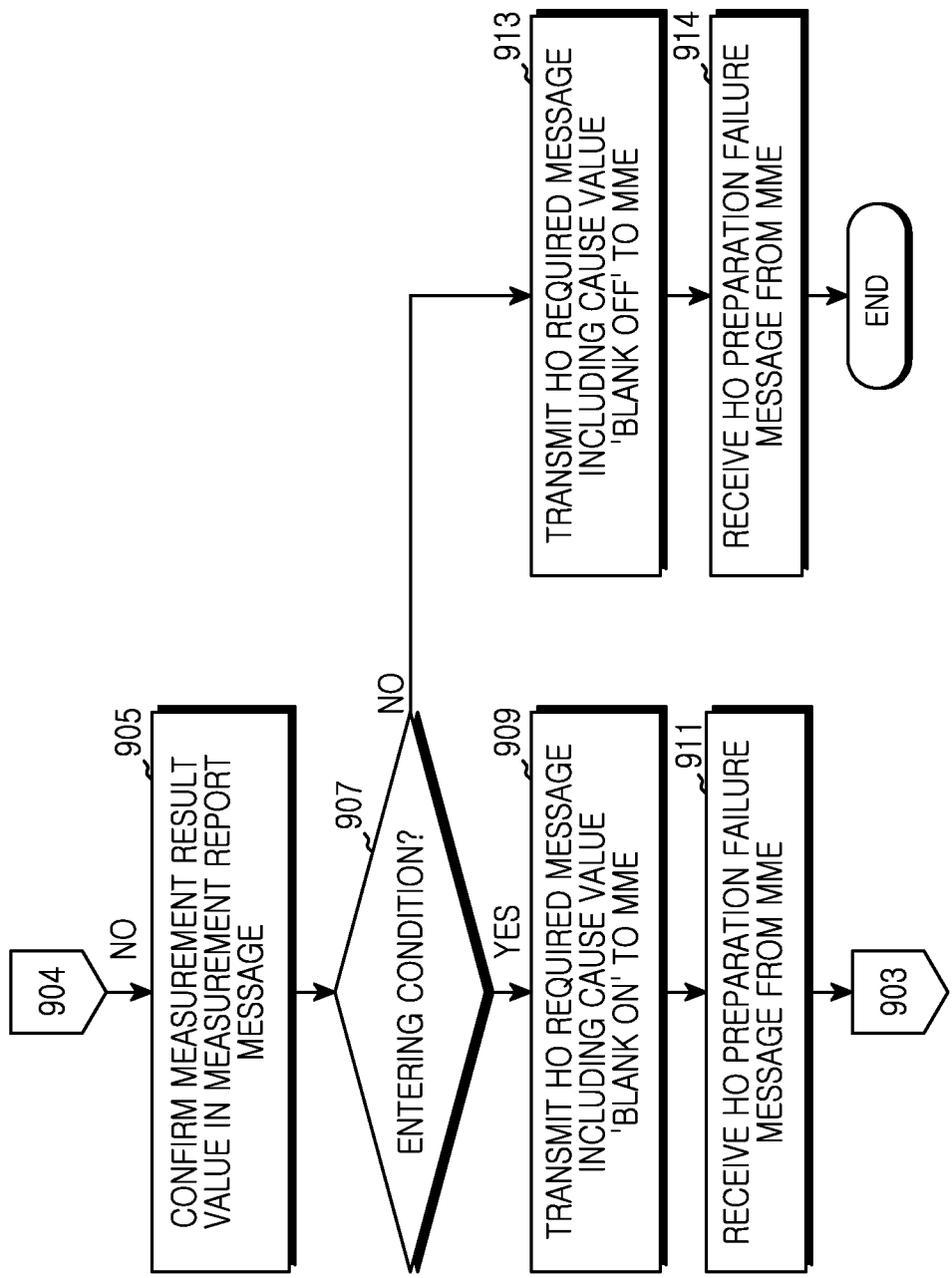

FIGS. 9A and 9B illustrate operations of a macro base station in a wireless communication system of a hierarchical cell structure according to an exemplary embodiment of the present invention.

In step 901, the macro base station transmits an RRC connection reconfiguration message to a macro terminal. Herein, the RRC connection reconfiguration message is transmitted from a macro base station to a macro UE on a periodic basis or according to an event. Using the RRC connection reconfiguration message, the macro UE can set a measurement reporting configuration for a blanking trigger and a measurement reporting configuration for the handover trigger with respect to a base station ID used by a corresponding pico base station per neighbor pico base station.

In step 903, the macro base station determines whether the measurement report message including the MeasID corresponding to the measurement reporting configuration for the blanking trigger of the pico base station is received from the macro terminal.

Receiving from the macro UE the measurement report message including the MeasID corresponding to the measurement reporting configuration for the blanking trigger of the pico base station in step 903, the macro base station determines whether an ID of a measurement object base station is the macro base station in step 904.

When the ID of the measurement object base station is the macro base station in step 904, the macro base station returns to step 903.

When the ID of the measurement object base station is not the macro base station in step 904, the macro base station confirms the measurement result value in the received measurement report message in step 905 and examines whether the confirmed measurement result value is an entering condition indicating entry to the blanking region in step 907.

When the confirmed measurement result value is the entering condition indicating the entry to the blanking region in step 907, the macro base station transmits a HO required message including a cause value 'Blank ON' to an MME in step 909, receives a HO preparation failure message from the MME in step 911, and returns to step 903.

When the confirmed measurement result value is a leaving condition indicating the leaving from the blanking region in step 907, the macro base station transmits the HO required message including the cause value 'Blank OFF' to the MME in step 913, receives the HO preparation failure message from the MME in step 914, and then ends the process.

In contrast, not receiving from a macro UE the measurement report message including the MeasID corresponding to the measurement reporting configuration for the blanking trigger of the pico base station in step 903, the macro base station determines whether the measurement report message including the MeasID corresponding to the measurement reporting configuration for the handover trigger of the pico base station is received from the macro UE in step 915.

When the measurement report message including the MeasID corresponding to the measurement reporting configuration for the handover trigger of the pico base station is not received from the macro UE in step 915, the macro base station returns to step 903.

When the measurement report message including the MeasID corresponding to the measurement reporting configuration for the handover trigger of the pico base station is received from the macro UE in step 915, the macro base station transmits the HO required message including the cause value defined for the handover to the MME in step 917. Next, the macro base station can receive the HO command message from the MME according to the handover required message in step 919.

Next, the macro base station ends the process.

Figure 10:
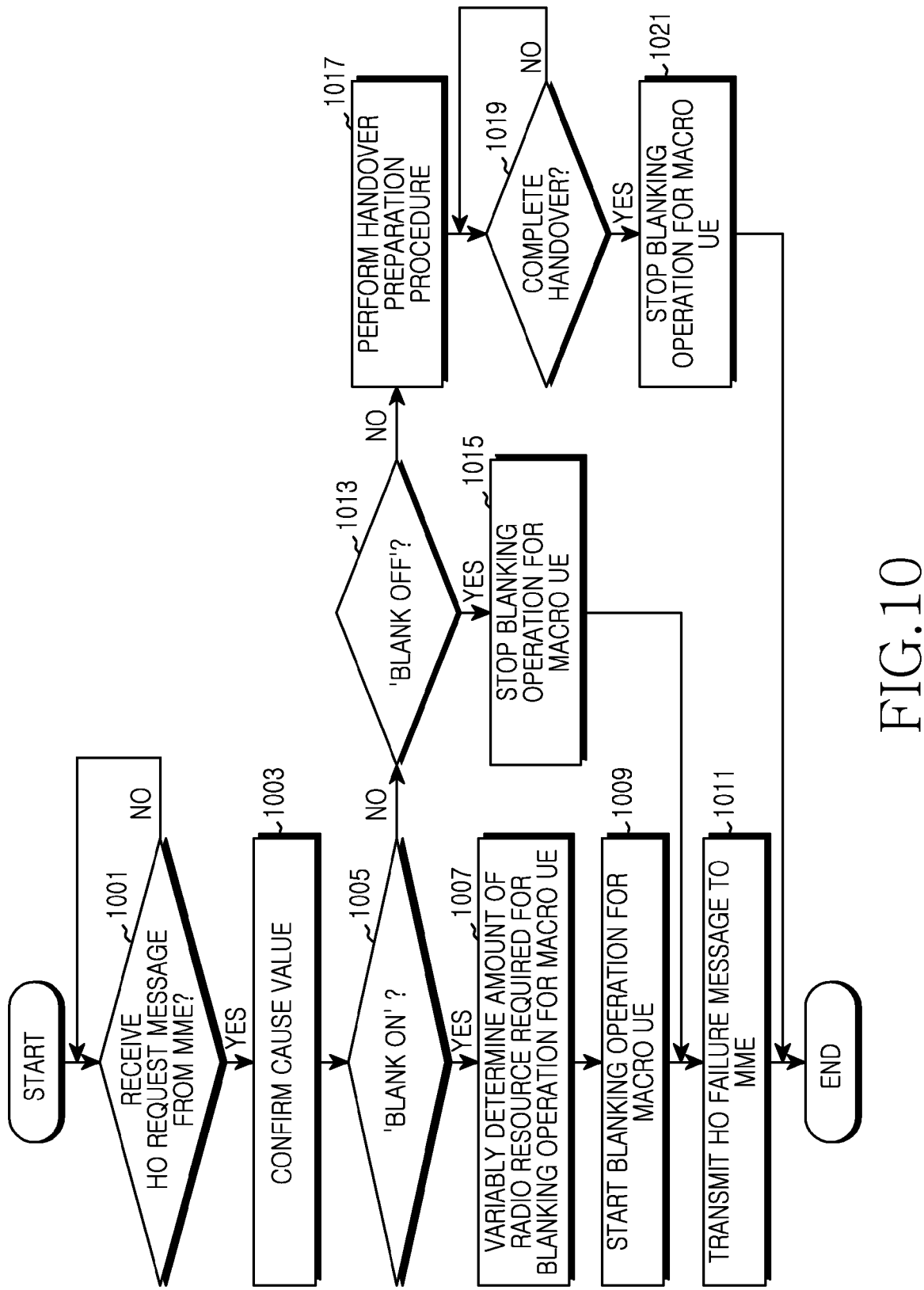
FIG. 10 illustrates operations of a pico base station in a wireless communication system of a hierarchical cell structure according to an exemplary embodiment of the present invention.

FIG. 10 illustrates operations of a pico base station in a wireless communication system of a hierarchical cell structure according to an exemplary embodiment of the present invention.

In step 1001, the pico base station determines whether a HO request message is received from an MME.

When the HO request message is received from the MME in step 1001, the pico base station confirms a cause value in the received HO request message in step 1003 and examines whether the confirmed cause value is 'Blank ON' indicating that a blanking operation is necessary for a macro UE in step 1005.

When the confirmed cause value is 'Blank ON' in step 1005, the pico base station variably determines an amount of a radio resource required for the blanking operation for a corresponding macro UE in step 1007. Herein, when the macro base station requests the blanking operation for the plurality of the macro UEs, the pico base station determines an amount of a radio resource, for example, a number of subbands (hereinafter, referred to as the number of blanking subbands) necessary for the blanking operation for the macro UEs and determines the total number of the blanking subbands of the pico base station at a corresponding point by combining the determined subband numbers. Next, the pico base station can compare the total number of the blanking subbands combined and determined with the maximum number of the blanking subbands and determine the smaller number of the subbands as the amount of the radio resource required for the actual blanking operation.

Next, the pico base station starts the blanking operation for the macro UE using a variably determined amount of the radio resource in step 1009, transmits the HO failure message to the MME in step 1011, and then ends the process.

In contrast, when the confirmed cause value is not 'Blank ON' in step 1005, the pico base station examines whether the confirmed cause value is 'Blank OFF' indicating the release of the blanking operation is necessary for the macro UE in step 1013.

When the confirmed cause value is 'Blank OFF' in step 1013, the pico base station stops the blanking operation for the corresponding macro UE in step 1015, transmits the HO failure message to the MME in step 1011, and then ends the process.

When the confirmed cause value is not 'Blank OFF' in step 1013, the pico base station determines that the confirmed cause value is the cause value for the handover informing that a handover preparation procedure is required for the macro UE, and thus performs the handover preparation procedure in step 1017, and examines whether the corresponding handover procedure is completed in step 1019.

When the corresponding handover procedure is completed in step 1019, the pico base station stops the blanking operation for the corresponding macro UE in step 1021 and then ends the process.

Figure 11:
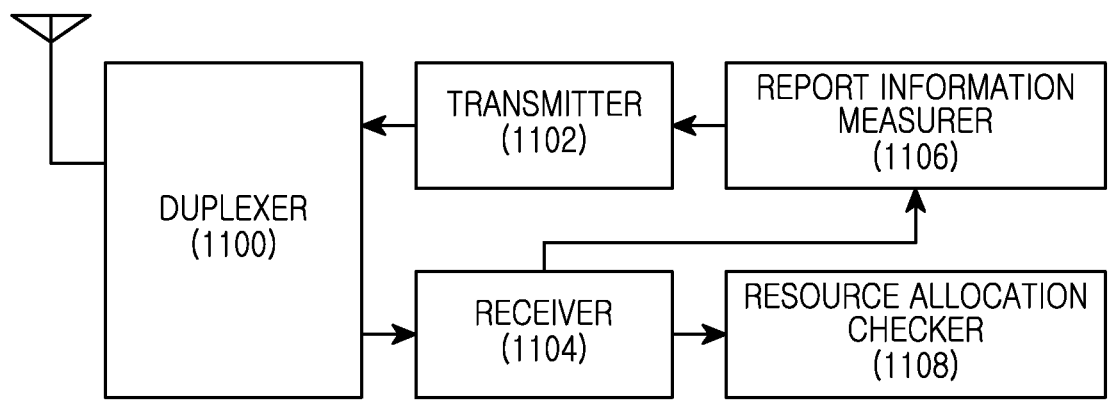
FIG. 11 illustrates a macro UE in a wireless communication system of a hierarchical cell structure according to an exemplary embodiment of the present invention.

FIG. 11 is a block diagram of the macro UE in a wireless communication system of a hierarchical cell structure according to an exemplary embodiment of the present invention.

Referring to FIG. 11, the macro UE includes a duplexer 1100, a transmitter 1102, a receiver 1104, a report information measurer 1106, and a resource allocation checker 1108.

The duplexer 1100, according to a duplexing scheme, transmits a transmit signal output from the transmitter 1102 via an antenna and provides a receive signal from the antenna to the receiver 1104.

The transmitter 1102 converts the transmit signal output from the report information measurer 1106 to a radio frequency signal and provides the radio frequency signal to the duplexer 1100. The receiver 1104 converts the receive signal output from the duplexer 1100 to a baseband signal. When the wireless communication system conforms to Orthogonal Frequency Division Multiplexing (OFDM), the transmitter 1102 includes an encoder, an OFDM modulator, a digital/analog converter, and a Radio Frequency (RF) processor, and the receiver 1104 includes an RF processor, an analog/digital converter, an OFDM demodulator, and a decoder.

The report information measurer 1106 receives the RRC connection reconfiguration message from the macro base station via the receiver 1104, and sets the measurement reporting configuration for a blanking trigger and the measurement reporting configuration for a handover trigger using the received RRC connection reconfiguration message. Next, the report information measurer 1106 measures a receive signal strength of a neighbor base station at preset intervals. When the measured receive signal strength value falls within a range of a reference receive signal strength value of the measurement reporting configuration for the blanking trigger, the report information measurer 1106 generates a measurement report message including an MeasID corresponding to the measurement reporting configuration for the blanking trigger of the corresponding pico base station and a measurement result value 'Entering Cond.' indicating entry to a blanking region to perform a blanking operation of a corresponding pico base station, and transmits the measurement report message to the macro base station through the transmitter 1102 and the duplexer 1100. When the measured receive signal strength value exceeds the range of the reference receive signal strength value of the measurement reporting configuration for the blanking trigger of the pico base station which previously performs the blanking operation for the macro UE, the report information measurer 1106 generates the measurement report message including the MeasID corresponding to the measurement reporting configuration for the blanking trigger of the corresponding pico base station and the measurement result value 'Leaving Cond.' indicating the leaving from the blanking region, and transmits the measurement report message to the macro base station through the transmitter 1102 and the duplexer 1100. When determining that the measured receive signal strength value is greater than the reference receive signal strength value of the measurement reporting configuration for the handover trigger of the neighbor pico base station, the report information measurer 1106 generates the measurement report message including the MeasID corresponding to the measurement reporting configuration for the handover trigger of the corresponding pico base station to perform the handover preparation procedure of the corresponding pico base station, and transmits the measurement report message to the macro base station through the transmitter 1102 and the duplexer 1100.

The resource allocation checker 1108 receives a resource allocation message from the macro base station via the receiver 1104, confirms the resource allocated to the macro UE based on the resource allocation message, and transmits and receives data to and from the serving macro base station over the allocated resource.

Figure 12:
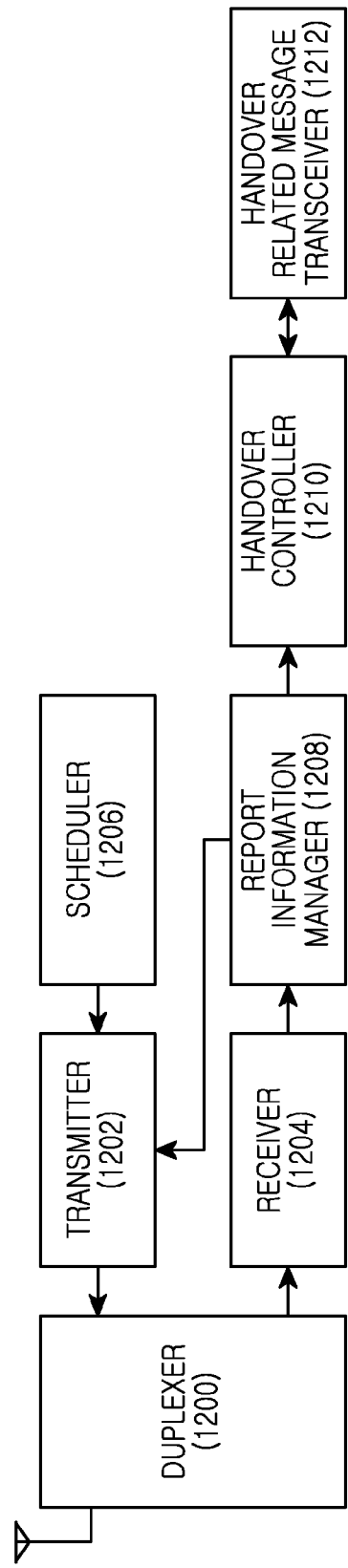
FIG. 12 illustrates a macro base station in a wireless communication system of a hierarchical cell structure according to an exemplary embodiment of the present invention.

FIG. 12 is a block diagram of a macro base station in a wireless communication system of the hierarchical cell structure according to an exemplary embodiment of the present invention.

Referring to FIG. 12, the macro base station includes a duplexer 1200, a transmitter 1202, a receiver 1204, a scheduler 1206, a report information manager 1208, a handover controller 1210, and a handover related message transceiver 1212.

The duplexer 1200, according to a duplexing scheme, transmits a transmit signal output from the transmitter 1202 via an antenna and provides a receive signal from the antenna to the receiver 1204.

The transmitter 1202 converts the transmit signal output from the scheduler 1206 or the report information manager 1208 to a radio frequency signal and provides the radio frequency signal to the duplexer 1200. The receiver 1204 converts the receive signal output from the duplexer 1200 to a baseband signal. For example, when the wireless communication system conforms to an OFDM, the transmitter 1202 includes an encoder, an OFDM modulator, a digital/analog converter, and an RF processor, and the receiver 1204 includes an RF processor, an analog/digital converter, an OFDM demodulator, and a decoder.

The scheduler 1206 performs scheduling to service macro UEs.

The report information manager 1208 generates and transmits an RRC connection reconfiguration message to a macro UE via the transmitter 1202 and the duplexer 1200. Using the RRC connection reconfiguration message, the macro UE can set a measurement reporting configuration for the blanking trigger and the measurement reporting configuration for the handover trigger. Next, when receiving the measurement report message including an MeasID corresponding to the measurement reporting configuration for the blanking trigger of the pico base station and the measurement result value 'Entering Cond.' indicating entry to the blanking region, from the macro UE via the duplexer 1200 and the receiver 1204, the report information manager 1208 provides the cause value 'Blank ON' to the handover controller 1210. The handover controller 1210 can generate and transmit a HO required message including a cause value 'Blank ON' to an MME via the handover related message transceiver 1212. Next, the handover controller 1210 can receive a HO preparation failure message from the MME via the handover related message transceiver 1212. When determining that the measurement report message including the MeasID corresponding to the measurement reporting configuration for the blanking trigger of the pico base station and the measurement result value 'Leaving Cond.' indicating the leaving from the blanking region is received from the macro UE via the duplexer 1200 and the receiver 1204, the report information manager 1208 provides a cause value 'Blank OFF' to the handover controller 1210. The handover controller 1210 can generate and transmit the HO required message including the cause value 'Blank OFF' to the MME via the handover related message transceiver 1212. Next, the handover controller 1210 can receive the HO preparation failure message from the MME via the handover related message transceiver 1212. When determining that the measurement report message including the MeasID corresponding to the measurement reporting configuration for the handover trigger of the pico base station is received from the macro UE via the duplexer 1200 and the receiver 1204, the report information manager 1208 provides the cause value defined for the handover to the handover controller 1210. The handover controller 1210 generates and transmits the HO required message including the cause value defined for the handover to the MME via the handover related message transceiver 1212. Next, the handover controller 1210 can receive the HO command message in response to the HO required message from the MME via the handover related message transceiver 1212.

The handover controller 1210 controls to generate and process the handover related message.

The handover related message transceiver 1212 transmits and receives the handover related messages to and from the pico base station via the MME.

Figure 13:
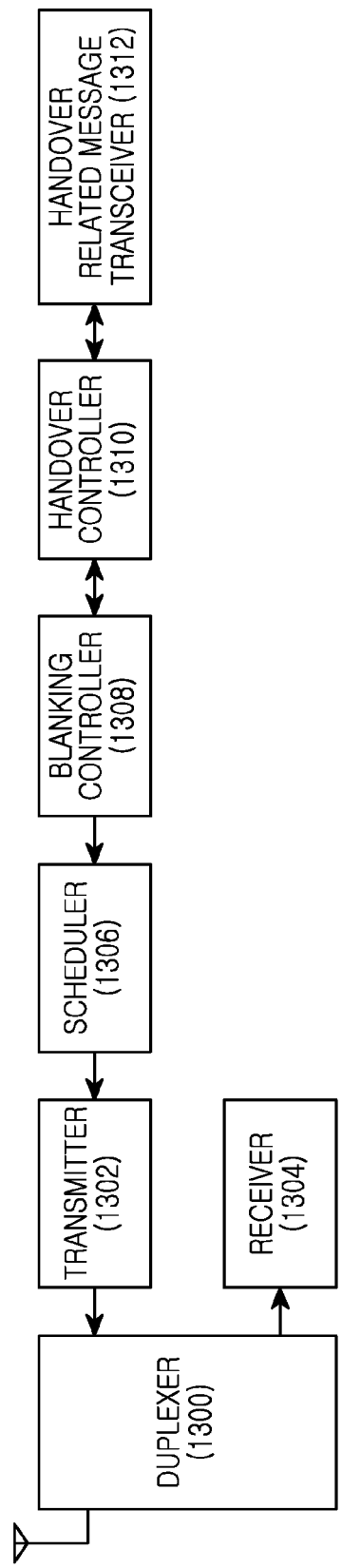
FIG. 13 illustrates a pico base station in a wireless communication system of a hierarchical cell structure according to an exemplary embodiment of the present invention.

FIG. 13 is a block diagram of a pico base station in a wireless communication system of a hierarchical cell structure according to an exemplary embodiment of the present invention.

Referring to FIG. 13, the pico base station includes a duplexer 1300, a transmitter 1302, a receiver 1304, a scheduler 1306, a blanking controller 1308, a handover controller 1310, and a handover related message transceiver 1312.

The duplexer 1300, according to a duplexing scheme, transmits a transmit signal output from the transmitter 1302 via an antenna and provides a receive signal from the antenna to the receiver 1304.

The transmitter 1302 converts the transmit signal output from the scheduler 1306 to a radio frequency signal and provides a radio frequency signal to the duplexer 1300. The receiver 1304 converts the receive signal output from the duplexer 1300 to a baseband signal. For example, when the wireless communication system conforms to an OFDM, the transmitter 1302 includes an encoder, an OFDM modulator, a digital/analog converter, and an RF processor, and the receiver 1304 includes an RF processor, an analog/digital converter, an OFDM demodulator, and a decoder.

The scheduler 1306 performs scheduling to service pico UEs.

When the handover controller 1310 provides a cause value 'Blank ON' indicating that a blanking operation is necessary for a macro UE, the blanking controller 1308 variably determines an amount of a radio resource required for the blanking operation for a corresponding macro UE, starts the blanking operation for the macro UE using a variably determined amount of the radio resource, and controls the handover controller 1310 to generate and transmit a HO failure message to the MME. When the handover controller 1310 provides a cause value 'Blank OFF' indicating that it is necessary to release the blanking operation for the macro UE, the blanking controller 1308 stops the blanking operation for the corresponding macro UE and controls the handover controller 1310 to generate and transmit the HO failure message to the MME. When the handover controller 1310 provides a cause value defined for the handover indicating that the handover preparation procedure for the macro UE is necessary, the blanking controller 1308 controls the handover controller 1310 to generate and transmit a HO request ACK message to the MME and stops the blanking operation for the corresponding macro UE. In so doing, the scheduler 1306 can variably determine the amount of the radio resource schedulable to the pico UE, according to a start or a release of the blanking operation.

The handover controller 1310 controls to generate and process the handover related message. More particularly, the handover controller 1310 receives the HO request message from the MME via the handover related message transceiver 1312, confirms the cause value in the received HO request message, and provides the cause value to the blanking controller 1308.

The handover related message transceiver 1312 transmits and receives the handover related messages to and from the macro base station via the MME.

As set forth above, an adaptive blanking apparatus and method in a wireless communication system of a hierarchical cell structure can mitigate an interference exerted by a pico base station on an adjacent macro UE and prevent communication quality degradation of the macro UE. Further, by variably determining an amount of an edge-band not allocated to a pico UE or allocated to the pico UE by limiting a transmit and receive power to alleviate interference exerted by the pico base station on the adjacent macro UE, radio resource utilization of the pico base station can be enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a terminal in a wireless communication system including at least one macro base station and at least one pico base station in a coverage of the macro base station, the method comprising:
   setting measurement reporting configuration for a blanking trigger;
   measuring a receive signal strength of the pico base station;
   comparing the measured receive signal strength with a reference signal strength for the blanking trigger; and
   when the measured receive signal strength is greater than the reference signal strength for the blanking trigger, transmitting to the macro base station, a measurement report message comprising a measurement identifier corresponding to the measurement reporting configuration for the blanking trigger and a value of the measured receive signal strength,
   wherein the reference signal strength for the blanking trigger is smaller than a reference signal strength for a handover trigger,
   wherein the pico base station is configured to perform a blanking operation corresponding to the measurement report message for the blanking trigger, and the blanking operation comprises one of not allocating a certain frequency band to the terminal and allocating the frequency band by limiting a transmit and receive power, and
   wherein the frequency band comprises a partial frequency band not used by the macro base station and the pico base station at a same time.

2. The method of claim 1, further comprising:
   receiving a Radio Resource Control (RRC) connection reconfiguration message from the macro base station,
   wherein the RRC connection reconfiguration message comprises information relating to the measurement reporting configuration for the blanking trigger and measurement reporting configuration for the handover trigger.

3. The method of claim 1, further comprising:
   comparing the measured receive signal strength with a reference signal strength for the handover trigger; and
   when the measured receive signal strength is greater than the reference signal strength for the handover trigger, transmitting to the macro base station, a measurement report message comprising a measurement identifier for the handover trigger and a value of the measured receive signal strength.

4. An operating method of a macro base station in a wireless communication system including the macro base station and at least one pico base station in a coverage of the macro base station, the method comprising:
   allocating to a terminal a measurement identifier with a measurement reporting configuration for a blanking trigger;
   receiving a measurement report message from the terminal, the measurement report message comprising the measurement identifier for the blanking trigger and a measured receive signal strength of the terminal being greater than a reference signal strength for the blanking trigger; and
   upon receipt of the measurement report message comprising the measurement identifier for the blanking trigger, transmitting a handover required message comprising a cause value for blanking operation to a Mobility Management Entity (MME),
   wherein the reference signal strength for the blanking trigger is smaller than a reference signal strength for a handover trigger, wherein the blanking operation is performed by the pico base station, and the blanking operation comprises one of not allocating a certain frequency band to the terminal and allocating the certain frequency band by limiting a transmit and receive power, and wherein the frequency band comprises a partial frequency band not used by the macro base station and the pico base station at a same time.

5. The method of claim 4, further comprising:
transmitting a Radio Resource Control (RRC) connection reconfiguration message to the terminal,
wherein the RRC connection reconfiguration message comprises information relating to the measurement reporting configuration for the blanking trigger and measurement reporting configuration for the handover trigger.

6. The method of claim 4, further comprising:
receiving from the terminal, a measurement report message comprising a measurement identifier for the handover trigger and a measured receive signal strength being greater than the reference signal strength for the handover trigger; and
upon receipt of the measurement report message comprising the measurement identifier for the handover trigger, transmitting a handover required message comprising a cause value for a handover operation to the MME.

7. An operating method of a pico base station in a wireless communication system including at least one macro base station and the pico base station in a coverage of the macro base station, the method comprising:
receiving a handover request message from a Mobility Management Entity (MME), the handover request message comprising a cause value for a blanking operation; and
upon receipt of the handover request message, performing a blanking operation for a terminal,
wherein the blanking operation comprises one of not allocating a certain frequency band to the terminal and allocating the frequency band by limiting a transmit and receive power, and
wherein the frequency band comprises a partial frequency band not used by the macro base station and the pico base station at a same time.

8. The method of claim 7, wherein the performing of the blanking operation comprises:
when the confirmed cause value is a cause value for requesting the blanking operation, variably determining an amount of a radio resource necessary for the blanking operation for the terminal and starting the blanking operation for the terminal based on the variably determined amount of the radio resource; and
when the confirmed cause value is at least one of a cause value for releasing the blanking operation and a cause value for handover, stopping the blanking operation for the terminal.

9. An apparatus of a terminal in a wireless communication system including at least one macro base station and at least one pico base station in a coverage of the macro base station, the apparatus comprising:
a report information measurer configured to set measurement reporting configuration for a blanking trigger, to measure a receive signal strength of the pico base station, to compare the measured receive signal strength with a reference signal strength for the blanking trigger, and when the measured receive signal strength is greater than the reference signal strength for the blanking trigger, to generate a measurement report message comprising a measurement identifier corresponding to the measurement reporting configuration for the blanking trigger and a value of the measured receive signal strength; and
a transmitter configured to transmit the generated measurement report message to the macro base station,
wherein the reference signal strength for the blanking trigger is smaller than a reference signal strength for a handover trigger,
wherein the pico base station is configured to perform a blanking operation corresponding to the measurement report message for the blanking trigger, the blanking operation comprising one of not allocating a certain frequency band to the terminal and allocating the frequency band by limiting a transmit and receive power, and
wherein the frequency band comprises a partial frequency band not used by the macro base station and the pico base station at a same time.

10. The apparatus of claim 9, further comprising:
a receiver configured to receive a Radio Resource Control (RRC) connection reconfiguration message from the macro base station,
wherein the RRC connection reconfiguration message comprises information relating to the measurement reporting configuration for the blanking trigger and measurement reporting configuration for the handover trigger.

11. The apparatus of claim 9, wherein the report information measurer is further configured to compare the measured receive signal strength with a reference signal strength for the handover trigger, and when the measured receive signal strength is greater than the reference signal strength for the handover trigger, to generate a measurement report message comprising a measurement identifier for the handover trigger and a value of the measured received signal strength, and
the transmitter is configured to transmit the generated measurement report message comprising the measurement identifier for the handover trigger to the macro base station.

12. An apparatus of a macro base station in a wireless communication system including the macro base station and at least one pico base station in a coverage of the macro base station, the apparatus comprising:
a receiver configured to receive a measurement report message from a terminal;
a report information manager configured to allocate to the terminal a measurement identifier with a measurement reporting configuration for a blanking trigger and upon receipt of the measurement report message comprising the measurement identifier for the blanking trigger and a measured receive signal strength of the terminal being greater than a reference signal strength for the blanking trigger, to generate a handover required message comprising a cause value for a blanking operation; and
a handover related message transceiver configured to transmit the generated handover required message to a Mobility Management Entity (MME),
wherein the reference signal strength for the blanking trigger is smaller than a reference signal strength for a handover trigger,
wherein the blanking operation is performed by the pico base station, and the blanking operation comprises one of not allocating a certain frequency band to the terminal and allocating the frequency band by limiting a transmit and receive power, and wherein the frequency band comprises a partial frequency band not used by the macro base station and the pico base station at a same time.

13. The apparatus of claim 12, further comprising:
a transmitter configured to transmit a Radio Resource Control (RRC) connection reconfiguration message to the terminal, wherein the RRC connection reconfiguration message comprises information relating to the measurement reporting configuration for the blanking trigger and measurement reporting configuration for the handover trigger.

14. The apparatus of claim 12, wherein the receiver is further configured to receive from the terminal, a measurement report message comprising a measurement identifier for the handover trigger and a measured receive signal strength being greater than the reference signal strength for the handover trigger;
the report information manager is further configured to generate a handover required message comprising a cause value for a handover operation, upon receipt of the measurement report message comprising the measurement identifier for the handover trigger; and
the handover related message transceiver is further configured to transmit the handover required message comprising the cause value for the handover operation to the MME.

15. An apparatus of a pico base station in a wireless communication system including at least one macro base station and the pico base station in a coverage of the macro base station, the apparatus comprising:
a handover related message transceiver configured to receive a handover request message from a Mobility Management Entity (MME), the handover request message comprising a cause value for a blanking operation; and
a blanking controller configured to perform a blanking operation for a terminal, upon receipt of the handover request message,
wherein the blanking operation comprises one of not allocating a certain frequency band to the terminal and allocating the frequency band by limiting a transmit and receive power, and
wherein the frequency band comprises a partial frequency band not used by the macro base station and the pico base station at a same time.

16. The apparatus of claim 15, wherein, when the confirmed cause value is a cause value for requesting the blanking operation, the blanking controller variably determines an amount of radio resource necessary for the blanking operation for the terminal and starts the blanking operation for the terminal based on the variably determined amount of the radio resource, and
when the confirmed cause value is a cause value for releasing the blanking operation or a cause value for handover, the blanking controller stops the blanking operation for the terminal.

17. An operating method of a macro base station in a wireless communication system including the macro base station and at least one pico base station in a coverage of the macro base station, the method comprising:
allocating to a terminal a measurement identifier with measurement reporting configuration for a blanking trigger;
receiving a measurement report message from the terminal, the measurement report message comprising the measurement identifier for the blanking trigger and a measured receive signal strength of the terminal being greater than a reference signal strength for the blanking trigger;
upon receipt of the measurement report message comprising the measurement identifier for the blanking trigger, transmitting a handover required message for a blanking operation to a Mobility Management Entity (MME), the handover required message comprising the measurement identifier for the blanking trigger and a value of the measured receive signal strength,
wherein the reference signal strength for the blanking trigger is smaller than a reference signal strength for a handover trigger,
wherein the blanking operation is performed by the pico base station, and the blanking operation comprises one of not allocating a certain frequency band to the terminal and allocating the frequency band by limiting a transmit and receive power, and
wherein the frequency band comprises a partial frequency band not used by the macro base station and the pico base station at a same time.

18. An operating method of a pico base station in a wireless communication system including at least one macro base station and the pico base station in a coverage of the macro base station, the method comprising:
receiving a handover request message from a Mobility Management Entity (MME), the handover request message comprising a measurement identifier for a blanking trigger and a measured receive signal strength of a terminal being greater than a reference signal strength for the blanking trigger; and upon receipt of the handover request message, performing a blanking operation for the terminal,
wherein the blanking operation comprises one of not allocating a certain frequency band to the terminal and allocating the frequency band by limiting a transmit and receive power, and
wherein the frequency band comprises a partial frequency band not used by the macro base station and the pico base station at a same time.

19. An apparatus of a macro base station in a wireless communication system including the macro base station and at least one pico base station in a coverage of the macro base station, the apparatus comprising:
a receiver configured to receive a measurement report message from a terminal;
a report information manager configured to allocate to the terminal a measurement identifier with measurement reporting configuration for a blanking trigger and upon receipt of the measurement report message comprising the measurement identifier for the blanking trigger and a measured receive signal strength of the terminal being greater than a reference signal strength for the blanking trigger, to generate a handover required message for a blanking operation, the handover required message comprising the measurement identifier for the blanking trigger and a value of the measured receive signal strength; and
a handover related message transceiver configured to transmit the generated handover required message to a Mobility Management Entity (MME),
wherein the reference signal strength for the blanking trigger is smaller than a reference signal strength for a handover trigger,
wherein the blanking operation is performed by the pico base station, and the blanking operation comprises one of not allocating a certain frequency band to the terminal and allocating the frequency band by limiting a transmit and receive power, and wherein the frequency band comprises a partial frequency band not used by the macro base station and the pico base station at a same time.

20. An apparatus of a pico base station in a wireless communication system including at least one macro base station and the pico base station in a coverage of the macro base station, the apparatus comprising:

a handover related message transceiver configured to receive a handover request message from a Mobility Management Entity (MME), the handover request message comprising a measurement identifier for a blanking trigger and a measured receive signal strength of a terminal being greater than a reference signal strength for the blanking trigger; and a blanking controller configured to perform a blanking operation for the terminal, upon receipt of the handover request message, wherein the blanking operation comprises one of not allocating a certain frequency band to the terminal and allocating the frequency band by limiting a transmit and receive power, and wherein the frequency band comprises a partial frequency band not used by the macro base station and the pico base station at a same time.

* * * * *